US008082083B2

(12) United States Patent
Pirri et al.

(10) Patent No.: US 8,082,083 B2
(45) Date of Patent: Dec. 20, 2011

(54) METHOD TO CONTROL THE VIBRATIONS IN AN ARTICULATED ARM FOR PUMPING CONCRETE, AND RELATIVE DEVICE

(75) Inventors: Nicola Pirri, Milan (IT); Paolo Dario Maini, Monza (IT); Ferruccio Resta, Milan (IT); Alessandro Tosi, Milan (IT); Francesco Ripamonti, Erba (IT)

(73) Assignee: CIFA SpA, Senago (MI) (IT)

( * ) Notice: Subject to any disclaimer, the term of this patent is extended or adjusted under 35 U.S.C. 154(b) by 280 days.

(21) Appl. No.: 12/403,920

(22) Filed: Mar. 13, 2009

(65) Prior Publication Data

US 2009/0229457 A1 Sep. 17, 2009

(30) Foreign Application Priority Data

Mar. 17, 2008 (IT) .............................. UD2008A0057

(51) Int. Cl.
*G06F 7/70* (2006.01)

(52) U.S. Cl. .......................................................... 701/50

(58) Field of Classification Search ..................... 701/50
See application file for complete search history.

(56) References Cited

U.S. PATENT DOCUMENTS

| | | | | |
|---|---|---|---|---|
| 4,896,582 | A * | 1/1990 | Tordenmalm et al. | 91/361 |
| 5,560,431 | A * | 10/1996 | Stratton | 172/2 |
| 7,143,682 | B2 | 12/2006 | Nissing et al. | |
| 7,610,136 | B2 * | 10/2009 | Okamura et al. | 701/50 |
| 7,748,147 | B2 * | 7/2010 | Schoenmaker et al. | 37/348 |
| 7,756,622 | B2 * | 7/2010 | Gianoglio et al. | 701/50 |

FOREIGN PATENT DOCUMENTS

| | | | |
|---|---|---|---|
| DE | 100 16 136 | A1 | 10/2001 |
| DE | 100 16 137 | A1 | 10/2001 |
| EP | 1 772 588 | A2 | 4/2007 |
| FR | 2 670 705 | A1 | 6/1992 |
| JP | 7-133094 | A | 5/1995 |
| JP | 2000-282687 | A | 10/2000 |
| WO | 02/055813 | A1 | 7/2002 |

OTHER PUBLICATIONS

Fuller et al., “Active Control of Vibration”, chapter 3.9, fig. 3.10, Academic Press Ltd. 2006 ISBN 012-269441-4.

Magni, “Robust Modal Control with a Toolbox for Use with Matlab”, chapter 1.2, figs. 1.3-1.11, chapter 2 and related figures, Kluwer Academic 2002, ISBN 0-306-46773-9.

* cited by examiner

*Primary Examiner* — Thomas Will
*Assistant Examiner* — Joel F. Mitchell
(74) *Attorney, Agent, or Firm* — Novak Druce + Quigg, LLP

(57) ABSTRACT

An active control method to control the vibrations of an articulated arm consisting of a plurality of segments articulated with respect to each other, by means of an electronic controller, comprising the following steps:

a) construction of a modal model of the articulated arm starting from experimental data or from structural models;
b) assignation of gains of electronic controller;
c) multiplication of gains by the difference between the reference modal coordinates and those calculated through the modal model starting from directly measured quantities, in order to determine the control forces to be applied to the arm, or to at least part of the relative segments;
d) evaluation of the modal coordinates by means of a states estimator;
e) comparison between measurements estimated using the modal coordinates and real measurements and correction of the estimate, so that the estimate converges on real values.

11 Claims, 3 Drawing Sheets

METHOD TO CONTROL THE VIBRATIONS IN AN ARTICULATED ARM FOR PUMPING CONCRETE, AND RELATIVE DEVICE

FIELD OF THE INVENTION

The present invention concerns a method to control the vibrations in an articulated arm for pumping concrete, and the relative device.

More particularly, the invention concerns an active control method used to reduce the vibrations to which the various segments of an articulated arm are subjected, the arm being used for pumping concrete in operating machines such as for example, pumps transported on trucks, concrete mixers or suchlike, whether they are mounted or not on trucks or trailers.

BACKGROUND OF THE INVENTION

Heavy work vehicles are known, used in the building trade, normally consisting of a truck on which an extendible arm is mounted, and/or telescopically extendible, articulated to distribute and cast concrete. The trucks may be equipped with concrete mixers or not.

Extendible arms of a known type consist of a plurality of segments pivoted to each other and foldable on each other, so as to be able to assume a folded configuration close to the truck, and a working configuration in which they are extended one with respect to the other and allow to reach areas very far from the truck.

One of the most important characteristics of these extendible arms is their ability to reach the greatest heights and/or lengths possible, so as to be able to guarantee maximum flexibility and versatility of use with the same truck.

The increase in the number of articulated segments, or the extension in measurement of each of them, on the one hand entails the possibility of obtaining greater overall lengths in maximum extension, but on the other hand entails an increase in the weights and bulk which are not compatible with current legislation or with the operativeness and functionality of the vehicle.

It is also known that a very serious disadvantage for the correct effectiveness of these arms, which increases as the overall length of the arm and the number of its segments increase, is the phenomenon of vibrations to which the arm is subject as the concrete is distributed. These vibrations entail considerable operating difficulties both for the operator in charge of manually positioning and directing the tube from which the concrete exits, and also for the operator who moves the arm by means of remote control.

An important component of the vibrations also derives from the type of these machines and their characteristics of slimness, their inertial and elastic properties, and the type of construction. These characteristics induce dynamic stresses into the articulated arm which are associated both with the motions of the machine, in a substantially static condition or in any case when it is not pumping, and also with the dynamic loads associated with the pumping step of the concrete.

In fact, for use, the machine always has to act in transitory conditions between one placement and the next, or during its movement; this implies that its motion is continuously excited and dynamic variations are generated on the state of stress of the joints and in the material, which limits the working life of the machine and reduces safety for the operators.

Furthermore, to these effects are added the forced pulsating functioning associated with the piston pump used to pump the concrete, which often occurs at frequencies near the frequencies of the machine itself.

A known device which has the function of damping the vibrations of an articulated arm is described in U.S. Pat. No. 7,143,682. In this known device a compensation mechanism is provided, on the side of the drive system, to compensate a disturbance which has determined a movement of the arm with respect to the position envisaged: the disturbance may consist for example of the fluctuations in pressure at which the concrete is delivered.

The teaching of U.S. Pat. No. '682 is specifically directed to the uncontrolled movements of the arm, or of one or more of its segments, that are generated during the phase of delivery of the concrete, particularly due to the cyclical loads to which the concrete distribution arm is subjected in the phase of delivery and which have the effect of making the entire arm perform a vibration motion. Moreover, this document does not provide to built and use a theoretical numerical model able to represent the condition of the arm and/or of its segments when it/they is/are subjected to the movement by the operator to move the arm in the position of delivery of the concrete before starting the concrete delivery step.

Other devices to control and compensate the vibrations of an articulated arm are described in JP 7133094 and JP 2000-282687.

These known devices, however, are to be considered in practice not totally satisfactory, since their intervention logic is limited to correcting the vibration at the point where it is detected, trying to compensate it with a localized correction intervention without intervening actively on the general structure of the arm considering the various components that cause the vibration.

Purpose of the invention is therefore to obtain a perfected method of active control of the vibrations of an articulated arm, which allows to correct and compensate the vibrations.

The Applicant has devised, tested and embodied the present invention to obtain this purpose, and other advantages described hereafter.

SUMMARY OF THE INVENTION

The present invention is set forth and characterized in the main claims, while the dependent claims describe other innovative characteristics of the invention.

The active control method for damping the vibrations of an articulated arm for pumping concrete according to the present invention bases its functioning logic on the fact that the main difficulty in implementing an active control consists substantially of two points:

- the machine changes its inertial and elastic characteristics according to the configuration in which it works, which makes it difficult to apply and tune classic controllers, such as for example those described in the prior art documents mentioned above;
- the detection of quantities for the feedback of the control system must be able, through easily applied measurements in terms of cost and strength, to separate the part associated with the vibratory motions from those associated with the movements desired in the positioning step and deriving from commands by an operator.

Another point that is to be considered is that in order to dampen the vibrations in one specific point, for example the tip of the arm from which the concrete is delivered, is necessary to consider the contribution to the vibration of all the segments of the arms, including both the component due to the positioning movement imparted by the operator and the component due to the vibrations which are superimposed to the movement imparted by the operator.

A further point to be considered is that the present invention is aimed to control the vibrations in a specific point which can be located along the whole length of the arm, not only the final segment involved in the delivery of the concrete. In fact, the case may be, it can be necessary to control also an intermediate point of the arm, for example if the arm is introduced with a median part thereof inside a window, or the arm is moved near a tree, a building or the like.

Based on these considerations, the present invention substantially consists of an active control method and an electronic control device which performs said method, and which implement a control logic based on:

- a structured and physical numerical model of the machine, able to define the real configuration of the machine itself, both in a static and in a dynamic condition;
- a linearization in segments of the various configurations, with associated abacuses containing the gains of a feedback controller evaluated through control methods using the states (positioning of auto-values);
- a modal approach for the application of the positioning methods of the poles, which allows to reduce the reference numerical model which describes the behavior of the whole arm, and of all of the segments thereof, to a limited number of degrees of freedom (and hence of variables) for easy management in real time, hence with high response speed;
- one or more instruments, for example sensors or suchlike, together with a so-called state observer, able to allow the interface between physical measurements (accelerations, deformations, displacements or speed) and the "modal" model used in the control step.

More particularly, the aforesaid one or more instruments are configured to acquire data related to the behavior of the arm and of all of its segments along its whole length, not only in a specific end point thereof.

The control logic of the vibrations therefore acts by means of a feedback force which is added to the command given by the operator for the movement of the whole arm, if he intervenes during a command, or determining a compensation force also with the arm stationary during a pumping operation which itself causes vibrations.

The rigid movement (hereafter denominated "broad motion") of the arms is in any case entrusted to the control of the operator, whereas the active control of the vibrations of the whole arm acts in the form of an additional command, which is superimposed to the command of the operator, with the task of damping the oscillations of the whole structure of the arm in order to make the whole arm moving following the theoretical movement commanded by the operator.

The main objective of the active control method according to the present invention is to contain the oscillations of the structure associated with the first modes of vibrating which mainly participate in the increase of the dynamic load. The modes with higher frequency, in fact, have a higher damping and therefore do not contribute appreciably to the motion.

This consideration, together with the need to contain the variables and hence the calculation times, allows the method according to the present invention to provide intervention only on a limited number of the modes of vibrating.

According to the invention, the operation to damp the vibrations is made by using a control determined on the basis of a numerical model which is based, for its implementation and application, on a reference model written in the form of the modes of the structure (modal model).

According to a preferential form of embodiment of the invention, the numerical modal model is constructed starting from experimental data or from structural models available to the designer.

On the basis of these data and/or models it is possible to construct a dynamic model which describes the behavior of the arm through a rigid movement and a deformation around said broad motion described by superimposition of the modes of vibrating according to the position assumed.

In this modeling, the state variables which describe the system are no longer physical variables (displacements and speed) but modal variables, and represent the "measurement" of how much each mode of vibrating participates, also according to the broad motion imparted by manual control, in the overall motion of the arm.

These state variables are equal in number to the modes of the system.

However, as we said before, the higher frequency modes are negligible, therefore it is possible to extract only the contributions relating to the first modes of vibrating, thus obtaining a simplified and reduced "modal model", usable in the synthesis of the gains of the controller.

This numerical modal model, although formed by a limited number of degrees of freedom, in any case constitutes an optimum approximation of the complete numerical model, but is much simpler to manage from the point of view of the computational load.

Having defined the reduced modal model as described above, it is possible to evaluate, for example using methods for assigning auto-values, the gains of a controller using the states.

According to a preferential embodiment, non-restrictive, of the present invention, the calculation is performed by setting the position of the poles of the system in the complex Gauss plane. In assigning the poles, the objective is to increase the damping of the system (or the real part of the auto-values only).

The gains will be expressed as a function of the position assumed by the arm during the broad motion. For this reason they must be tabulated and registered in pre-memorized tables, and then introduced into the control system using a procedure of linearization in segments. During the motion, the electronic controller, according to the position detected, interpolates the gains values memorized and uses these values in a feedback control logic between the reference state that coincides with the broad motion alone, due for example to the command by the operator (therefore without vibratory motions), and the current vibrations, which are described by the modal coordinates.

The gains thus calculated therefore multiply the difference between the reference modal coordinates (nil) and those measured (or estimated), and allow to determine the control forces to be applied, by means of the relative actuators, to the arm or to at least part of the relative segments.

The last step provides to evaluate the modal coordinates not directly measurable.

For this function the control system according to the invention provides to use a state estimator.

As we said, the modal coordinates cannot be traced back directly to any physical measurement, therefore they are not directly measurable. The problem therefore arises of estimating the coordinates starting from the measurements available (accelerometers, strain gauges, elongations of the actuators, . . . ). The estimator receives as input the measurements and the known forces acting on the real arm and supplies as output the estimate of the modal coordinates.

The estimator also works starting from the knowledge of the reduced modal model: inside it there are the matrixes which characterize the system, according to the position assumed.

The estimator compares the estimated measurements (calculated by multiplying the modal coordinates estimated by a suitable matrix, as will be seen better hereafter) with the real ones, then correcting the estimate so that it converges on the real values. The correction is made by multiplying the difference between measurement and estimate by a suitable set of gains.

According to the invention, the gains can be determined by means of various and different methods; in order to calculate the gains, a preferential solution provides to adopt the "Kalman Filter" or other analogous or similar calculation method.

BRIEF DESCRIPTION OF THE DRAWINGS

These and other characteristics of the present invention will become apparent from the following description of a preferential form of embodiment, given as a non-restrictive example with reference to the attached drawings wherein.

DETAILED DESCRIPTION OF A PREFERENTIAL FORM OF EMBODIMENT

Figure 1:
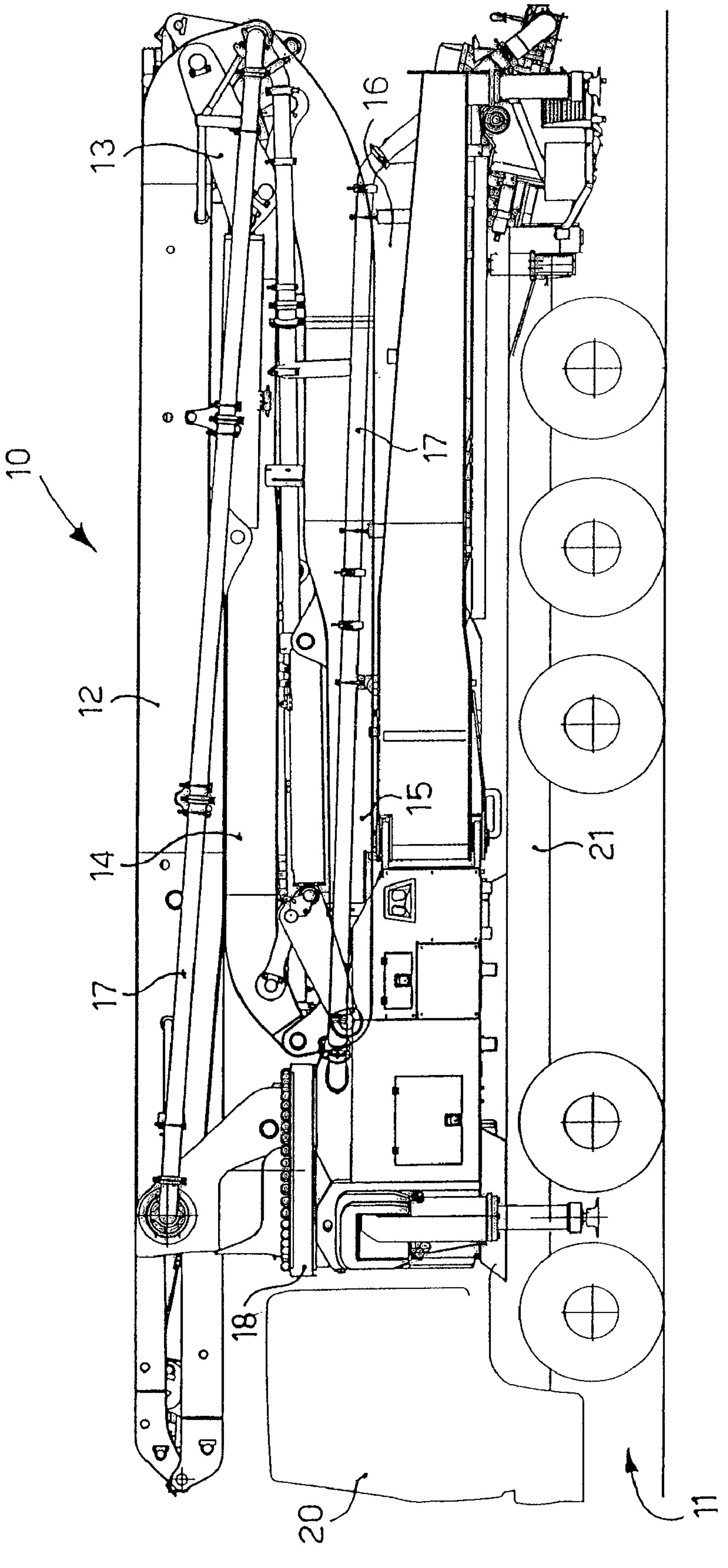
FIG. 1 is a schematic illustration of an operating machine with articulated arm for the distribution of concrete in which the control method according to the present invention is applied.

With reference to FIG. 1, an extendible articulated arm 10 according to the present invention, able to distribute concrete or analogous material for the building trade, is shown in its assembled position on a heavy work vehicle 11, in its folded condition, for transport.

The heavy vehicle 11 comprises a driver's cabin 20, and a supporting frame 21 on which the arm 10 is mounted.

The extendible arm 10 according to the present invention comprises a plurality of segments articulated, for example, in the embodiment shown, in six segments, respectively a first 12, a second 13, a third 14, a fourth 15, a fifth 16 and a sixth 17, pivoted to each other at the respective ends. In a known manner, and with systems not shown here, the totality of the articulated segments 12-17 can be rotated, even up to 360°, with respect to the vertical axis of the vehicle 11.

Figure 4:
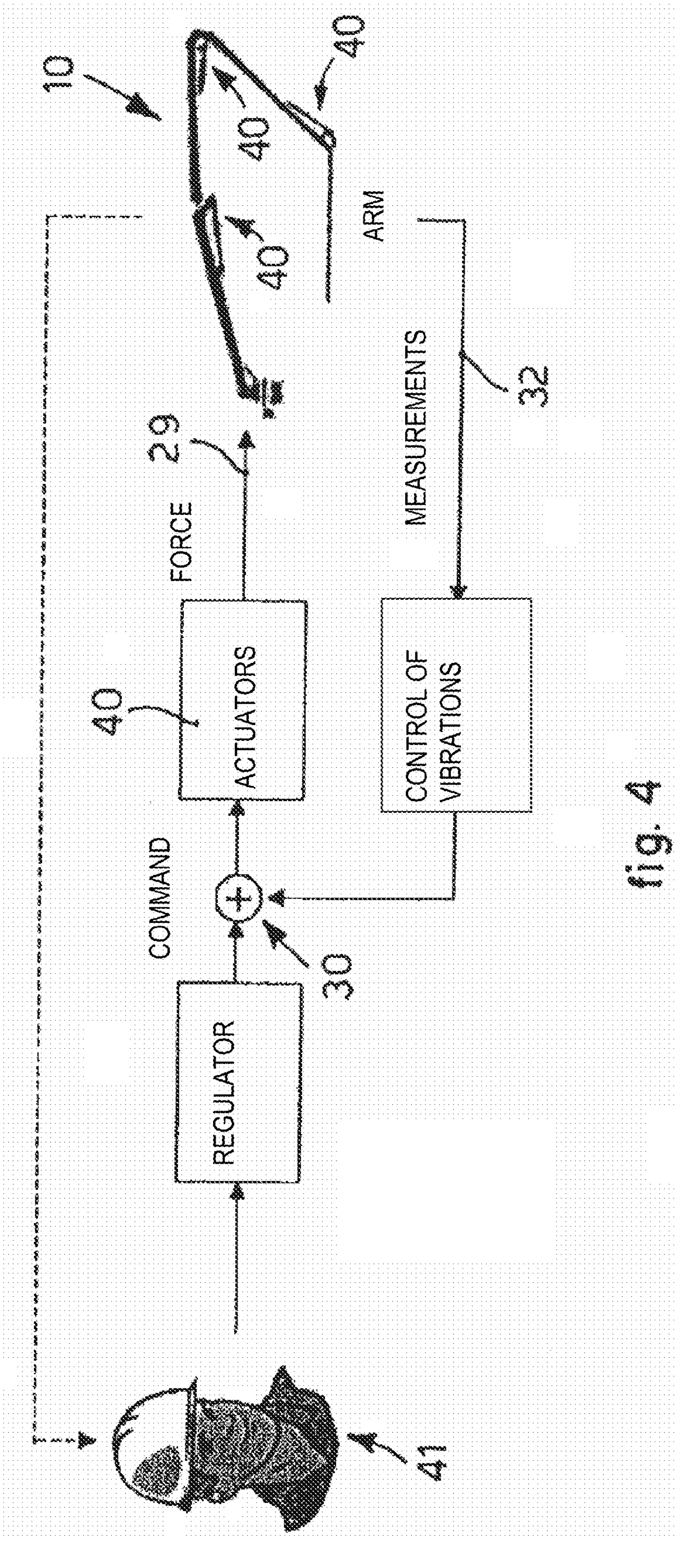
FIG. 4 is a simplified block diagram of the logic of the method according to the present invention.

With reference to FIG. 1, the first segment 12 is, in a known manner, pivoted to a turret 18, and can be rotated with respect thereto by means of its own actuator. The other segments 13-17 are sequentially pivoted to each other at respective ends and can be individually driven, by means of their own actuators, indicated in their entirety by the reference number 40 in the diagram in FIG. 4, according to specific requirements.

Figure 2:
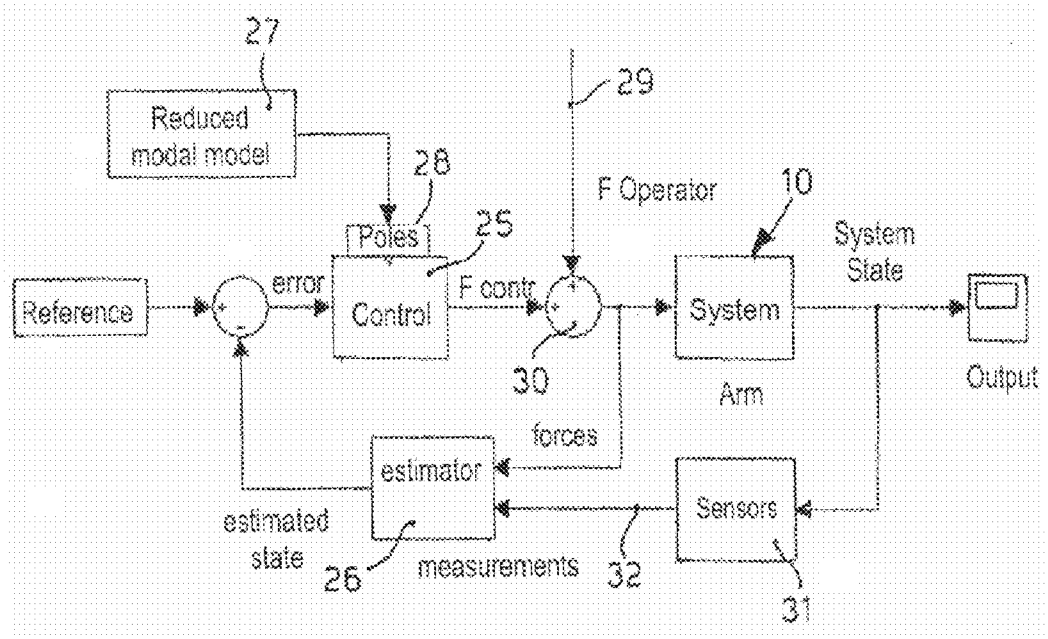
FIG. 2 is a block diagram of the control method according to the present invention.

With reference to FIG. 2, a block diagram is shown of the active control method to control the vibrations of the articulated arm 10 according to the present invention, using an electronic controller 25 and a state estimator 26.

The method according to the invention provides a step of constructing a reduced numerical modal model 27 constructed starting from experimental data or from structural models available to the designer.

As we said before, in this modeling the state variables that describe the system are no longer physical variables (displacements and speed) but are modal variables, and represent the contribution of how much each mode of vibrating participates in the overall motion of the arm 10.

The reduced numerical modal model 27 constitutes an optimum approximation of the complete model, and is easy to manage from the point of view of the computational load.

A second step in the method provides to evaluate the gains of the states controller 25 through the reduced modal model (different for every configuration achieved by the machine during the broad motion), setting the position of the poles, indicated by the reference number 28, of the system in the complex Gauss plane. In assigning the poles 28 the objective is to increase the damping of the system.

The gains are expressed as a function of the actual position assumed by the articulated arm 10 during the broad motion, and according to the value of force 29 actually transmitted to the arm 10 by the operator, which force 29 is added to the feedback control values, as better explained hereafter, in an adder 30.

In other words, the action to control the vibrations exerted by using the numerical modal model 27 according to the invention, is performed in calculating a vector in feedback:

$$\underline{u}_c=[G]\,\underline{\epsilon} \tag{1}$$

where $\underline{\epsilon}$ represents the vector of the errors between the reference value obtained by the reduced modal model and the real state, while [G] is a matrix of gains, calculated using said method. The purpose of the control of the vibrations is to define the matrix of gains [G] which, starting from the state of the system, provides a feedback control action so as to limit said vibrations, following the logic diagram shown in FIG. 4.

The matrix of gains [G] can be calculated using the calculation process described hereafter.

The system of equations that rule the dynamics of the articulated arm 10 can be seen as:

$$\underline{x}=[A(\underline{x})]\,\underline{x}+[B(\underline{x})]\,(u_c) \tag{2}$$

where the vector $\underline{x}$ contains the physical coordinates, in terms of displacements and speeds that describes the broad motion of the arm, [A] is the state matrix of the system whereas [B] is a matrix that is a function of the position reached by the articulated segments in relation to the force transmitted by means of the actuators 40.

Considering $\underline{q}$ as the vector of the modal coordinates of the system of interest (that is, the first modes of vibrating only), the reduced numerical modal model is obtained as an extraction from a modal model of the system (2) which can be expressed as:

$$\underline{q}=[A_{mod}]\,\underline{q}+[B_{mod}]\,(u_c) \tag{3}$$

From equation (1) we have $u_c$ can be expressed in terms of matrix of gains [G] multiplied by the error function $\underline{\epsilon}=(\underline{q}_{rif}-\underline{q})$, where we deduce the matrix of gains [G] as a function of several contributions of which the first is in a direct relation with the matrix $[A_{mod}]$, a second which represents the targeted increase in the damping of the system through the new poles, and finally in relation with the position of the arm 10.

During motion, the electronic controller 25, as a function of the detected position of the arm 10, or of its various segments, interpolates the values of gains memorized, and uses these values in a feedback control logic between the reference state $\underline{q}_{rif}$, which coincides with the broad motion only (therefore without vibratory motions) and the current vibrations $\underline{q}$, which are described, however, by the modal coordinates.

The gains thus calculated therefore multiply the difference between the reference modal coordinates (nil) and those measured (or estimated), and allow to determine the control forces to be applied by means of the relative actuators, to the arm 10, or to at least part of the relative segments.

The last step provides to evaluate the modal coordinates not directly measurable.

To carry out this evaluation the controller 25 provides to use a state estimator 26.

Figure 3:
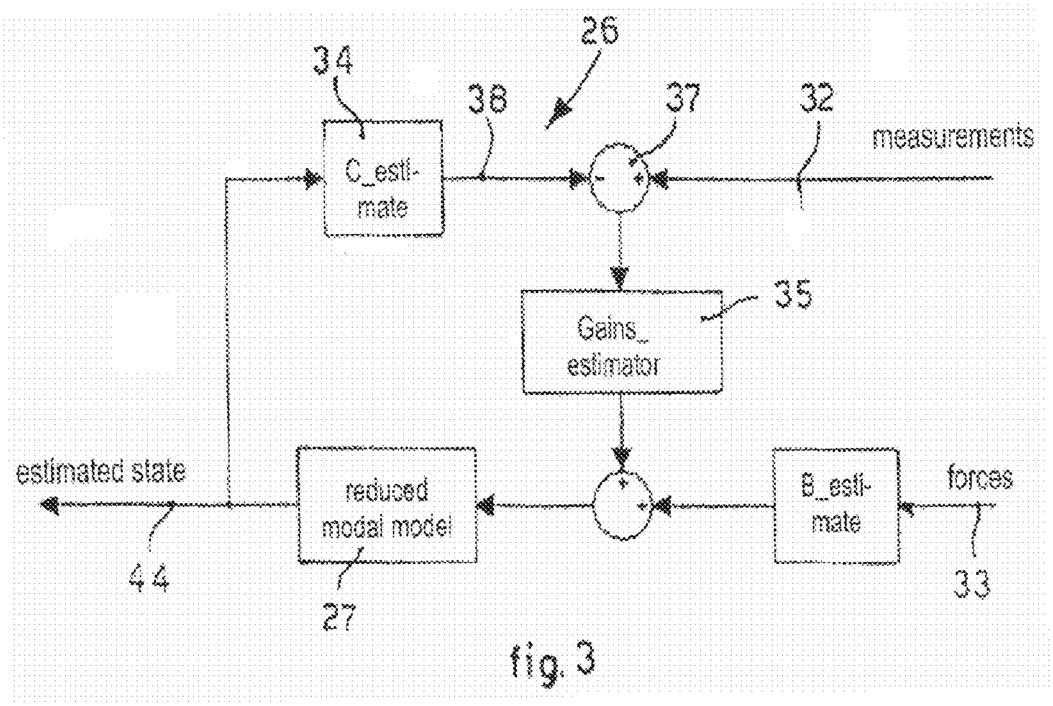
FIG. 3 is a block diagram of the estimate step used in the control method according to the present invention.

As we said above, to calculate the control force it is necessary to know the modal coordinates of the reduced model q. These coordinates cannot be traced back directly to any physical measurement, and therefore they cannot be measured directly. The problem therefore arises of estimating the coordinates starting from the measurements available obtained from a plurality of sensors 31, shown in FIG. 2, for example consisting of accelerometers, strain gauges, elongations of the actuators, or other analogous or comparable element, associated with the segments of the arm 10. As shown in FIG. 3, the estimator 26 receives as input, from said sensors 31, the measurements, indicated by the reference number 32, and the known forces, indicated by the reference number 33, actually acting on the arm 10, and supplies as output the estimate of the modal coordinates in terms of estimated state 44.

The estimator 26 also operates starting from the knowledge of the reduced modal model 27.

In particular, it calculates the estimated measurements, multiplying the modal coordinates estimated, obtained from the reduced modal model 27, by an estimate matrix 34 indicated by $[C_{estimate}]$.

The estimated measurements, indicated by the reference number 38 in FIG. 3, are then compared, in an adder 37, with the real measurements 32, then the estimate is corrected so that it converges on the real values.

The correction is made by the estimator 26 by multiplying the difference between measurements 32 and estimates 38 by a suitable set of gains 35, for example obtained with the Kalman Filter.

Modifications and variants may be made to the method and device as described heretofore, which come within the field of protection defined by the attached claims.

The invention claimed is:

1. An active method to control the vibrations of an articulated arm consisting of a plurality of segments articulated with respect to each other, by means of an electronic controller, each of these segments being associated to its own actuators, the method comprising the following steps:

a) construction of a numerical modal model of said articulated arm, described by modal variables, which is based on a reference model written in the form of the modes of the structure of the arm and is obtained starting from experimental data or from structural models, wherein, in the modal model, state modal variables that describe the system represent the contribution of how each mode of vibrating participates in the overall motion of the arm;

b) assignation of gains of said electronic controller, wherein said gains are expressed as a function of the actual position assumed by the articulated arm during the motion, and according to the value of force actually transmitted to the arm by the operator;

c) multiplication of said gains by the difference between the reference modal coordinates and those calculated through the modal model starting from directly measured quantities, to determine the control forces to be applied, by means of each of said relative actuators, to the arm or to at least part of the relative segments;

d) evaluation of the modal coordinates by means of a states estimator for estimating measurements;

e) comparison, in an adder, between the estimated measurements estimated using said modal coordinates and real measurements and correction of the estimate, so the estimate converges on real values; wherein said correction is made by an estimator by multiplying the differences between the real measurements and the estimated measurements by a suitable set of gains.

2. The method as in claim 1, wherein for the evaluation of said modal coordinates of said modal model said estimator uses available measurements obtained from a plurality of sensors associated with the segments of said arm, to acquire data related to the behavior of said arm, or segments thereof, along the whole length thereof.

3. The method as in claim 1, wherein for the construction of said numerical modal model only the contributions relating to the first modes of vibrating are used, to obtain a simplified and reduced modal model having a limited number of variables.

4. The method as in claim 3, wherein for the evaluation of said modal coordinates of said reduced modal model said estimator uses available measurements obtained from a plurality of sensors associated with the segments of said arm, to acquire data related to the behavior of said arm, or segments thereof, along the whole length thereof.

5. The method as in claim 4, wherein said sensors are accelerometers, strain gauges, elongations of the actuators, or other analogous or comparable element.

6. The method as in claim 4, wherein for the evaluation of said modal coordinates said estimator receives at input, from said sensors, a plurality of measurements and the known forces that actually act on said arm, and supplies as output the estimate of the modal coordinates in terms of an estimated state.

7. The method as in claim 1, wherein said step of assigning the gains of the electronic controller is performed by setting the position of poles of the arm in the complex Gauss plane, wherein, in said assignment of the poles, the objective is to increase the damping of the arm.

8. An active control device for performing the method as in claim 1, to control the vibrations of an articulated arm consisting of a plurality of segments articulated with respect to each other, each of these segments being associated to its own actuators, by means of an electronic controller, the device comprising:

a command and control unit equipped with processing and memory means for constructing and memorizing numerical modal model of said arm, described by modal variables, starting from experimental data or from structural models, means to assign the gains of said electronic controller, a unit able to multiply said gains by the difference between the reference modal coordinates and those calculated through the modal model starting from the quantities directly measured, to determine the control forces to be applied to the arm, or to at least part of the relative segments, a states estimator for evaluation of the modal coordinates; and an adder for comparing the estimated measurements using said modal coordinates and real measurements and correction of the estimate, so that said estimate converges on real values.

9. The device as in claim 8, wherein said actuators are able to be actuated by said electronic controller to apply to at least part of the segments which form the arm a relative control force to control the vibrations to which the arm or the segments thereof are subjected.

10. The device as in claim 8, wherein said numerical modal model is constructed using only the contributions relating to the first modes of vibrating, to obtain a simplified and reduced modal model having a limited number of variables.

11. The device as in claim 10, comprising a plurality of sensors associated with the segments of said arm for the evaluation of said modal coordinates of said reduced modal model said estimator uses available measurements obtained from the plurality of sensors associated with the segments of said arm, to acquire data related to the behavior of said arm, or segments thereof, along the whole length thereof.

* * * * *